United States Patent
Chang et al.

(10) Patent No.: US 7,467,308 B2
(45) Date of Patent: Dec. 16, 2008

(54) METHOD FOR TRANSMITTING THE SYSTEM COMMAND OF A COMPUTER SYSTEM

(75) Inventors: Ming-Jiun Chang, Taipei (TW); Chih-Cheng Han, Taipei (TW); Hsuan-Ching Chao, Taipei (TW); Chung-Hong Lai, Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 405 days.

(21) Appl. No.: 11/315,502

(22) Filed: Dec. 23, 2005

(65) Prior Publication Data

US 2006/0236139 A1 Oct. 19, 2006

(30) Foreign Application Priority Data

Apr. 15, 2005 (TW) .............................. 94112119 A

(51) Int. Cl.
*G06F 1/26* (2006.01)

(52) U.S. Cl. ....................................... 713/300; 713/320

(58) Field of Classification Search .................. 713/300, 713/320

See application file for complete search history.

(56) References Cited

U.S. PATENT DOCUMENTS

| | | | | |
|---|---|---|---|---|
| 6,065,122 | A * | 5/2000 | Wunderlich et al. | 713/320 |
| 6,085,330 | A * | 7/2000 | Hewitt et al. | 713/322 |
| 6,199,134 | B1 | 3/2001 | Deschepper et al. | |
| 6,357,013 | B1 | 3/2002 | Kelly et al. | |
| 6,360,327 | B1 | 3/2002 | Hobson | |
| 7,017,054 | B2 * | 3/2006 | Schuckle et al. | 713/300 |
| 7,159,046 | B2 * | 1/2007 | Mulla et al. | 710/9 |
| 7,206,883 | B2 | 4/2007 | Ho et al. | |
| 7,234,050 | B2 * | 6/2007 | Agan et al. | 713/1 |
| 7,315,953 | B2 | 1/2008 | Su et al. | |
| 7,330,926 | B2 * | 2/2008 | Ho | 710/311 |
| 2003/0167413 | A1 * | 9/2003 | Stachura et al. | 713/300 |
| 2005/0039063 | A1 * | 2/2005 | Hsu et al. | 713/324 |

\* cited by examiner

*Primary Examiner*—Nitin C Patel
(74) *Attorney, Agent, or Firm*—Patterson & Sheridan LLP

(57) ABSTRACT

A PCI-Express bus is incorporated in a method for transmitting a power-saving command between a computer system and its plurality of peripheral devices of the present invention. More particularly, a specific power management command is introduced into the signal transmission protocol of a system command, which is transmitted between the plural system chips. Therefore, the peripheral devices coupled with the system chips can enter a certain power mode simultaneously. The present invention is used to solve the problem of the peripheral devices cannot enter the certain power mode since the system chip has no power management unit disposed under the PCI-Express structure.

12 Claims, 4 Drawing Sheets

METHOD FOR TRANSMITTING THE SYSTEM COMMAND OF A COMPUTER SYSTEM

BACKGROUND OF THE INVENTION

1. Field of the Invention

A method for transmitting the system command of a computer system, more particularly, is provided for transmitting a power management command using a signal transmission protocol originally used for the system chips' communication, so the peripheral devices coupled with the system chips can enter a power mode smoothly.

2. Description of Related Art

The components and the peripherals of a computer system perform signal transmission via a bus transmitting digital data between each other. The bus, such as a peripheral component interconnect (PCI) bus, accelerated graphics port (AGP) or the like, is used for transmitting data. The signal or data transmission between a central processing unit (CPU) and a North/Southbridge chip or the system memory is through a specific bus, thereby both the peripherals and the system's components are coupled to the bus.

Reference is made to FIG. 1 showing the conventional. PCI bus 16 of a computer system that is used to couple with a plurality of peripheral devices a, b and c. In a low-power-mode of the computer system, a PCI special cycle performs when the CPU 10 receives a low-power instruction via the PCI bus 16 that is controlled by the Northbridge chip 11 or the Southbridge chip 12. After that, the peripheral devices a, b and c either enter a predetermined state in low-power-mode controlled by a BIOS (basic I/O system) 15, or transmit a low-power instruction to the system memory 13 or graphics chip 14 via a specific bus.

U.S. Pat. No. 6,357,013 discloses a plurality of low-power instructions transmitted via a PCI bus in a computer system. In view of the conventional PCI bus, every peripheral coupled to the PCI bus shares a 133 MB/sec bandwidth provided by a main channel for transmitting data to the Southbridge chip. Since the above-mentioned signal transmission via the PCI bus is set in timely order, if a large amount of data is being transmitted, the transmission rate will slower than normal. For example, if a new-development serial ATA (SATA) device or a gigabit-level network device couples to the conventional PCI bus, the efficiency of the transmission thereof will be reduced due to the insufficient amount of bandwidth.

As opposed to the current PCI standard using multi-drop technology, a PCI-Express standard introduces a switch point-to-point transmission technology. The physical layer of the PCI-Express bus has a set of single-tasking lane composed of a transmitting terminal and a receiving terminal. Moreover, each PCI-Express bus uses its own lane to independently communicate with the Southbridge chip. The common bus structure is few to use, rather an independent lane is used for the PCI-Express bus, thereby reducing interference within the data transmission. Furthermore, each piece of data under the PCI-Express standard has priority transmission, and therefore the PCI-Express standard will be the first chosen by the computer system.

The PCI-Express standard defines an L2 and L3 power mode used for supplying power to peripherals. Wherein, the L2 power mode indicates that a main power and a reference clock have been removed except for as auxiliary power. As such, the computer system enters its lowest power consuming condition and the system can be woken up anytime. The L3 power mode indicates that the main power and the reference clock have been removed without the provision of any auxiliary power and that the computer system will not resume until it reboots.

In the prior art, the power-saving mode of the computer system is initialized after some steps for signal communication between the CPU and the Southbridge chip, and the L2 and L3 power modes are defined. Then, an OS direct power management (OSPM) in the system initializes the peripheral devices to prepare to go into power-saving mode. Meanwhile, an advanced configuration and power interface (ACPI) installed in the Southbridge chip will notify the PCI-Express peripheral devices that they are prepared to go into power-saving mode.

Since the peripheral devices coupled to the Northbridge chip, such as a graphics card, a high-speed network card and the like, doesn't have any informing mechanism of a power mode command the peripheral devices coupled with the Northbridge chip via the PCI-Express bus will not enter a certain power mode smoothly.

SUMMARY OF THE INVENTION

Since the Northbridge chip of the prior art lacks of the informing mechanism of any power mode command, the present invention provides a method for transmitting the system command, such as a power management command, using a signal transmission protocol between the system chips.

A method for transmitting the system command of a computer system is provided for the signal transmission between the computer system and the peripheral devices via a PCI-Express bus. More particularly, the system command can be a power-saving mode command. For example, the specific power mode command is transmitted using a signal transmission protocol between the system chips, such as the Northbridge chip and the Southbridge chip. Then the peripheral devices coupled with the system chips can enter the power mode smoothly thereby solving the problem of peripheral devices being unable to simultaneously enter the power-saving mode owing to the first system chip not having a power management unit (PMU) installed therein.

The method for transmitting the system command as follows:

initially, an initial step of a system command has been achieved. Next, a second system chip therein executes the system command, thereby the peripheral devices coupled with the second system chip start to enter a power-saving mode. After that, the system command is transmitted to a first system chip, then the first system executes the system command so as to drive its coupled peripheral devices into the certain power mode. After the peripheral devices coupled with the first system chip has done the system command, the second system chip is informed, which presents that the peripheral devices coupled with the second system chip have achieved the system command. Finally, the peripheral devices coupled with the second system chip are driven into the power-saving mode.

A method for transmitting a system command of the preferred embodiment of the present invention is used to perform a power-saving command transmission between a computer system and a plurality of peripheral devices via a PCI-Express, comprising:

firstly, the computer system determines whether entering a power-saving mode, and then a CPU thereof transmits a Ready-Enter-Power-Saving-Mode command to a second system chip. The second system chip responds to the central processing unit afterward. The CPU transmits an Enter-Power-Saving-Mode command to the second system chip in the next step.

The peripheral devices coupled with the second system chip are driven into the power-saving mode, and further transmitting the Enter-Power-Saving-Mode command to a first system chip. The peripheral devices coupled with the first system chip are driven into the power-saving mode, and responding to the first system chip that its coupled peripheral devices have done the power-saving mode command. After that, the second system chip is informed that the peripheral devices coupled with the first system chip have done the power-saving mode command and driving the peripheral devices coupled with the second system chip to accomplish the power-saving mode command.

BRIEF DESCRIPTION OF THE DRAWINGS

The present invention will be readily understood by the following detailed description in conjunction with the accompanying drawings, in which.

DETAILED DESCRIPTION OF THE PREFERRED EMBODIMENTS

To allow the Examiner to understand the technology, means and functions adopted in the present invention further, reference is made to the following detailed description and attached drawings. The Examiner shall readily understand the invention deeply and concretely from the purpose, characteristics and specification of the present invention. Nevertheless, the present invention is not limited to the attached drawings and embodiments in following description.

Under a conventional PCI bus structure, a system chip of a computer system is not required to respond to a power management signal to a CPU when coupled peripheral devices thereto enter a power-saving mode via the PCI bus. Wherein the power mode can be a power-saving mode of the preferred embodiment. In the contrary, the peripheral devices under a PCI Express standard need to respond to the power management signal. Under this newly PCI Express standard, only a Southbridge chip has been specified the peripheral devices thereto has the previously mentioned response mechanism, which is not specified for the peripheral devices coupled with a Northbridge chip of the computer system.

A method for transmitting a system command of the present invention is provided for the peripheral devices coupled with the Northbridge chip entering a specific power mode. A signal transmission protocol, such as a Hypertransport technology used for a point-to-point communication of ICs, originally used between the system chips is introduced into use for transmitting the power management signals of the preferred embodiment. Therefore the peripheral devices coupled with the Northbridge chip can receive the power management signals and enter a certain same power mode after the peripheral devices coupled with the Southbridge chip have entered the power mode.

Figure 1:
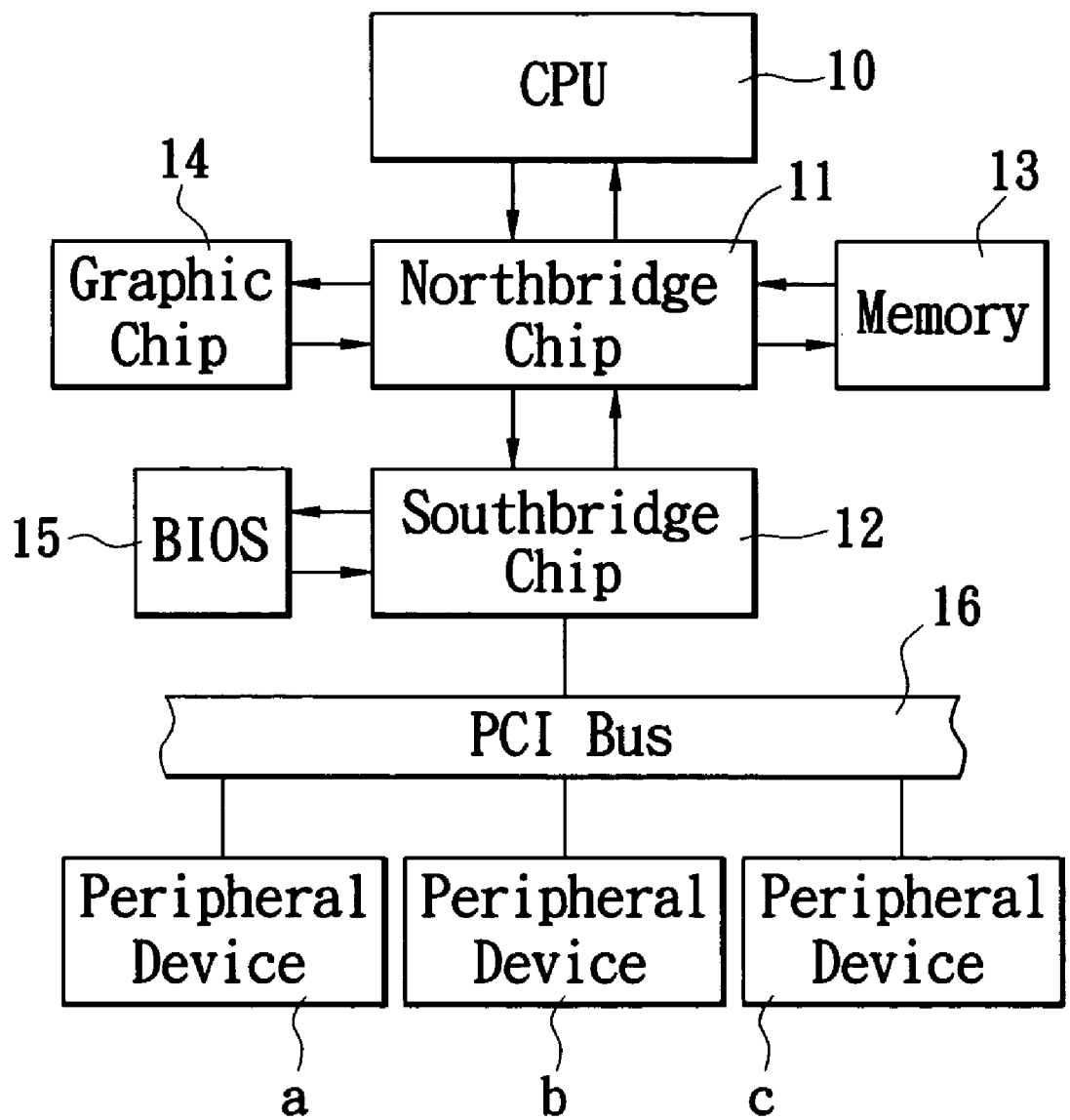
FIG. 1 shows a schematic diagram illustrating a conventional PCI bus used for a computer system of the prior art.
Figure 2:
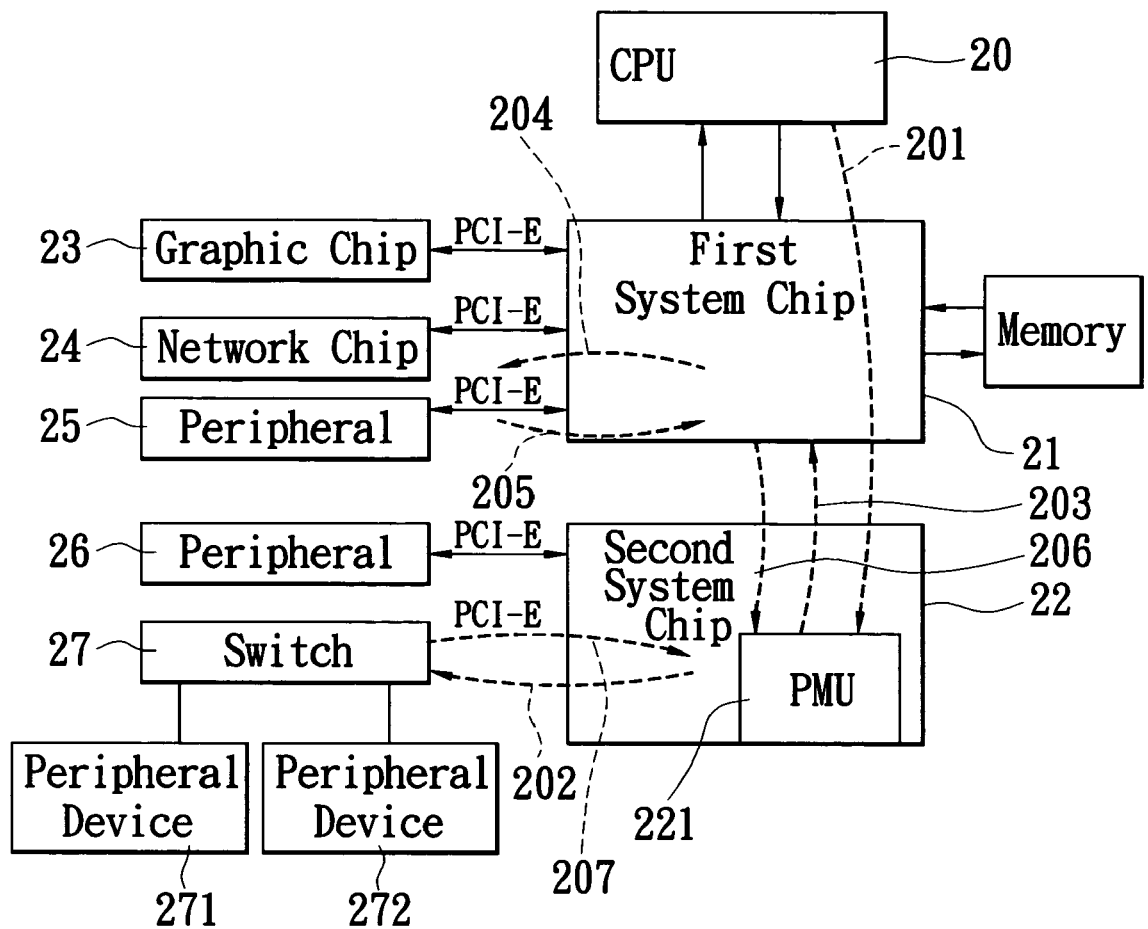
FIG. 2 shows a schematic diagram illustrating the signal transmission of a computer system of the present invention.

Reference is made to FIG. 2 that shows a schematic diagram of the signal transmission between the system chips. A first system chip 21 coupled to the CPU 20 can be the Northbridge chip forming one of the system chipset, and a second system chip 22 coupled to the first system chip 21 forms another system chipset. Each above-mentioned system chip couples to its proper peripheral devices via a PCI-Express bus. The first system chip 21 couples with at least a graphics chip 23, a network chip 24 and other peripheral device 25 not specifically shown in diagram. Moreover, the second system chip 22 couples with a plurality of peripherals 271, 272, and 273 and other shown peripheral devices 26 via a switch 27 of the PCI-Express bus.

In general, the Northbridge chip is mainly responsible for the data and the signal transmission between the CPU, system memory and the graphics interface, and being communicated with the Southbridge chip via the specific transmission protocol. Wherein, the Southbridge chip is essentially responsible for receiving and transmitting the input/output signals within the peripheral devices, which couple to the mainboard of the computer system. Moreover, interrupt requests from above-mentioned peripheral devices are transmitted to the CPU through the Northbridge chip, after that, the CPU performs the task allotment process and executes the required task in the computer system. The dashed lines shown in the diagram present the directions of the signal transmission of the preferred embodiment. Since the computer system is required to enter a power mode, the CPU 20 transmits a power management signal to the system chips afterward. When the CPU 20 and the second system chip 22 have accomplished the signal transmission and related response owing to the characteristics of the PCI-Express standard employed by the present invention, a first signal 201 is transmitted to the second system chip 22. In the preferred embodiment of the present invention, the first signal 201 is received by a power management unit (PMU) 221 installed in the second system chip 22, meanwhile, an ACPI (advance configuration and power interface) of the second system chip 22 performs a power control to its coupled peripheral devices using the PCI-Express bus.

When the second system chip 22 receives the first signal 201, a second signal 202 is used to inform that its coupled peripheral devices can enter the power mode. Next, the previously discussed signal transmission protocol used between the system chips is used to transmit a third signal 203 to the first system chip 21. After that, the first system chip 21 drives its coupled peripheral devices to prepare to enter the power mode by transmitting a fourth signal 204.

Since the peripheral devices coupled with the first system chip 21 have entered the power mode, the peripheral devices respond to the first system chip 21 using a fifth signal 205. Meanwhile, the first system chip 21 informs the second system chip 22 using a sixth signal 206 that the peripheral devices coupled with the first system chip 21 have entered the power mode. Next, the second system chip drives its coupled peripheral devices to enter the certain power mode by the ACPI thereof. Wherein, to switch off the communication ports of the peripheral devices is one scheme of the power modes. Subsequently, the peripheral devices respond to the second system chip 22 using a seventh signal 207.

Figure 3:
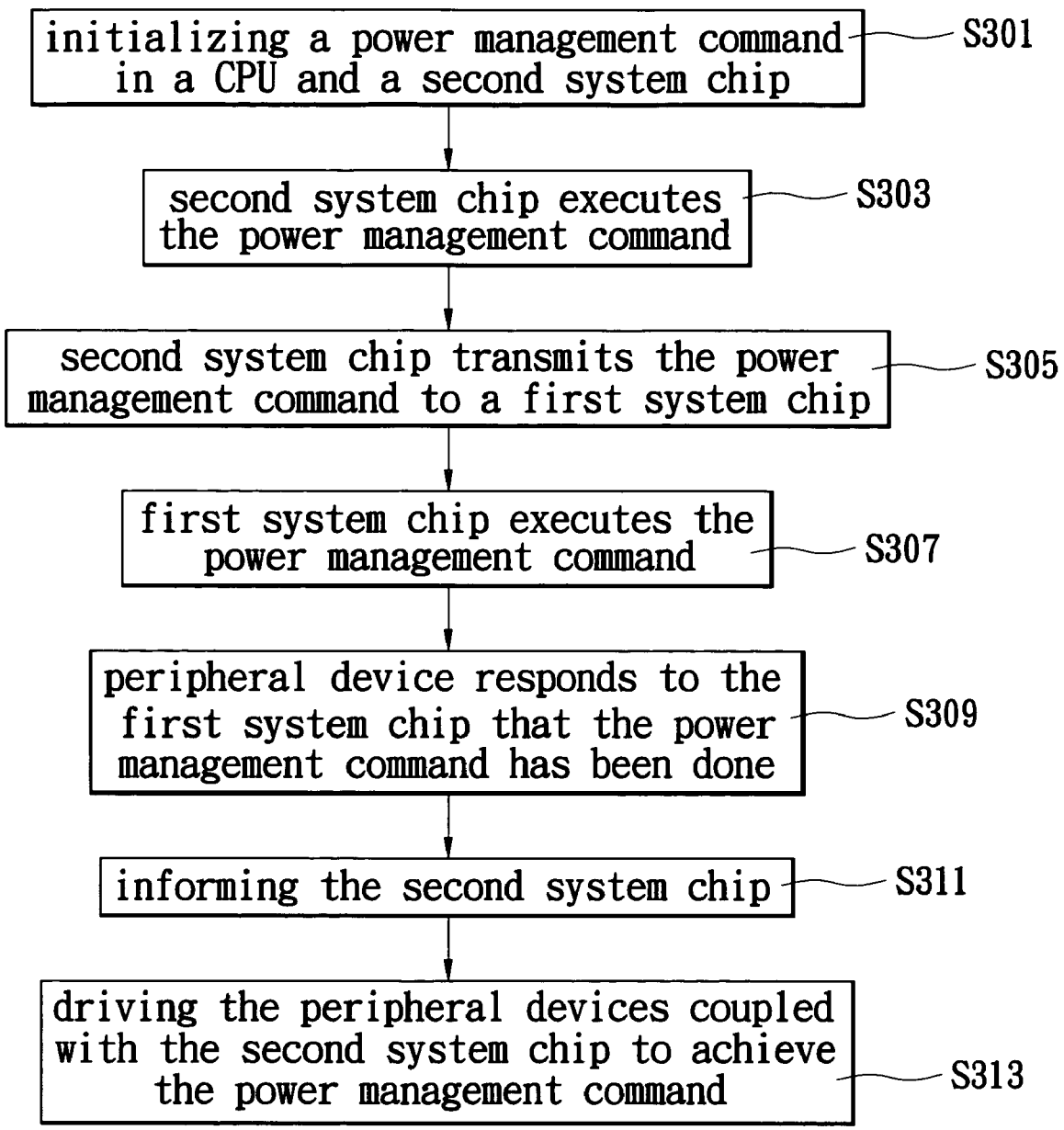
FIG. 3 illustrates a flowchart of the method for transmitting a system command of the present invention.

FIG. 3 shows a flowchart of the method for transmitting the system command of the preferred embodiment of the present invention.

Before the peripheral devices coupled with the system chips are demanded to enter a power mode, a system command, such as a power management command, transmitted between the CPU and the second system chip is initialized— for example, a handshake process is used to initialize the system command transmission (step S301).

After that, the second system chip receives the system command transmitted from the CPU, and executes the system command like the power management command. Then the peripheral devices coupled with the second system chip start to enter the specific power mode (step S303).

Next, the second system chip transmits the system command to a first system chip using the signal transmission protocol used between the system chips (step S305). Then the first system chip executes the system command—for example, the first system chip drives its coupled peripheral devices to prepare to enter the power mode (step S307).

After the peripheral devices have entered the power mode, the peripheral devices respond to the second system chip that the power management command has been done (step S309). Next, the first system chip informs the second system chip that the peripheral devices coupled the first system chip have entered the power mode (step S311). Since the peripheral devices coupled with the second system chip are driven to accomplish the system command, the peripheral devices respond to the second system chip next (step S313).

Such as the steps illustrated in FIG. 3, the peripheral devices coupled with the first system chip firstly enter the specific power mode, then the peripheral devices coupled with the second system chip enter the power mode sequentially. If the steps corresponds to the structure shown in FIG. 2, the system command can be a power management command for entering the power mode. The signal transmission between the first system chip 21 and the second system chip 22 use the original transmission bus. When the second system chip 22 receives the system command from the CPU 20, the first system chip 21 can accomplish the system command using an informing mechanism provided in the present invention. Next, the second system chip 22 also accomplish the system command after being informed by the first system chip 21.

Figure 4:
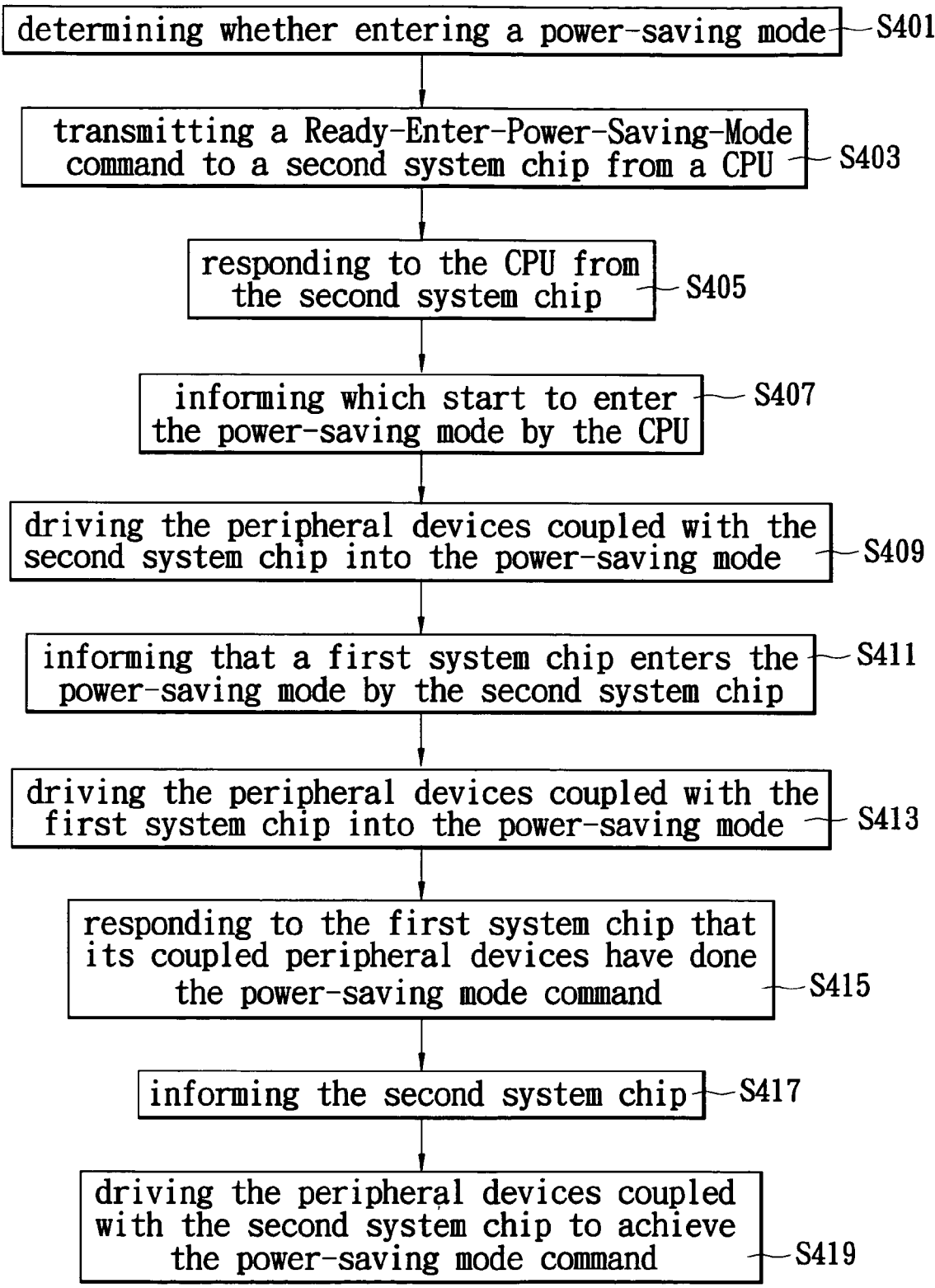
FIG. 4 shows a flowchart of the preferred embodiment of the method for transmitting a system command of the present invention.

FIG. 4 shows a flowchart of the preferred embodiment of the present invention.

Firstly, the CPU determines whether the computer system enters a power-saving mode or not (step S401). The power-saving mode command can be commanded by a computer user, or by a program of the computer system after determining the usage status of the computer system. Wherein the power usage status can be determined whether the computer system enters the power-saving mode. The power-saving mode can be separated into a plurality of modes according to different conditions of the power statuses.

Next, the CPU transmits a Ready-Enter-Power-Saving-Mode command to the second system chip (step S403). Then, the second system chip responds to the CPU (step S405), and the peripheral devices start to enter the power-saving mode while the CPU transmits the power-saving mode command to the second system chip (step S407).

After the second system chip receives the system command, its coupled peripheral devices are driven into the power-saving mode (step S409). The second system chip transmits an Enter-Power-Saving-Mode command to the first system chip using the signal transmission protocol (step S411). Next, the peripheral devices coupled with the first system chip are driven into the power-saving mode (step S413). After the peripheral devices have entered the power-saving mode, the peripheral devices respond to the first system chip that its coupled peripheral devices have done the power-saving mode command (step S415).

After the first system chip has done the system command sent from the CPU, the first system chip informs the second system chip using the signal transmission protocol (step S417). Next, after the peripheral devices coupled with the second system chip have accomplished the power-saving mode command, the peripheral devices respond to the second system chip.

The steps disclosed above in the present invention are used to solve the problem of the peripheral devices cannot enter the certain power mode since the system chip has no power management unit disposed under the PCI-Express structure. Consequently, all the coupled peripheral devices of the computer system can successfully enter a specific power-saving mode.

The many features and advantages of the present invention are apparent from the written description above and it is intended by the appended claims to cover all. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for transmitting a power-saving mode command of a computer system, comprising:

transmitting an initial Ready-Enter-Power-Saving-Mode (REPSM) command between a central processing unit (CPU) and a second system chip in an initial step;

executing the REPSM command, whereby a peripheral device coupled with the second system chip starts to enter a power-saving mode;

transmitting an Enter-Power-Saving-Mode (EPSM) command to a first system chip from the second system chip;

executing the system command, whereby a peripheral device coupled with the first system chip enters the power-saving mode, the first system chip informing the second system chip that the peripheral device coupled with the first system chip has executed the EPSM command; and in response to the first chip informing the second system chip, completing driving the peripheral device coupled with the second system chip into the power-saving mode.

2. The method of claim 1, wherein the first system chip is a Northbridge chip.

3. The method of claim 1, wherein the second system chip is a Southbridge chip.

4. The method of claim 1, wherein the step of transmitting an initial REPSM command comprising performing a handshake communication between the CPU and the second system chip.

5. The method of claim 1, wherein a signal transmission protocol between the system chips is provided to perform the step of transmitting the system command to the first system chip and the step of informing the second system chip.

6. The method of claim 1, wherein when the peripheral device coupled with the second system chip enters the power-saving mode, an acknowledgment signal is provided to the second system chip.

7. A method for transmitting a system command of a computer system, which is used to perform a power-saving command transmission between the computer system and a plurality of peripheral devices via a PCI-Express, comprising:

determining whether to enter a power-saving mode;

transmitting a Ready-Enter-Power-Saving-Mode command to a second system chip from a central processing unit;

responding to the central processing unit from the second system chip;

transmitting an Enter-Power-Saving-Mode command to the second system chip by the CPU;

driving the peripheral devices coupled with the second system chip into the power-saving mode;

transmitting the Enter-Power-Saving-Mode command to a first system chip from the second system chip;

driving the peripheral devices coupled with the first system chip into the power-saving mode;

the coupled peripheral devices responding to the first system chip that the EPSM command has been executed;

the first system chip informing the second system chip that the peripheral devices coupled with the first system chip have done the power-saving mode command; and in response to the first system chip informing the second system chip, driving the peripheral devices coupled with the second system chip to complete execution of the EPSM command.

8. The method of claim 7, wherein the first system chip is a Northbridge chip.

9. The method of claim 7, wherein the second system chip is a Southbridge chip.

10. The method of claim 7, wherein the power-saving mode command is received by a power management unit (PMU) of the second system chip.

11. The method of claim 7, wherein a signal transmission protocol between the system chips is provided to perform the step of transmitting the Enter-Power-Saving-Mode command to the first system chip and the step of informing the second system chip.

12. The method of claim 7, when the peripheral device coupled with the second system chip enters' the power-saving mode, an acknowledgment signal is provided to the second system chip.

* * * * *